Dec. 24, 1940.　　　A. F. MUSGRAVE ET AL　　　2,225,707
MECHANICAL LEAF TURNER
Filed Oct. 12, 1939　　　7 Sheets-Sheet 1

Patented Dec. 24, 1940

2,225,707

UNITED STATES PATENT OFFICE 2,225,707

MECHANICAL LEAF TURNER

Arthur F. Musgrave, Cambridge, and Theodore E. Dinsmoor, Boston, Mass.

Application October 12, 1939, Serial No. 299,140

27 Claims. (Cl. 84—519)

This invention relates to mechanical leaf turners for turning leaves or pages of a book, sheets of music or recorded matter of any kind or nature.

In order that the principle of the invention may be readily understood, we have disclosed a single embodiment thereof, together with certain modifications of the selected embodiment in the accompanying drawings, wherein—

Fig. 2 is a plan view of the said mechanism in non-operating position, namely, with a leaf completely turned and the suction member in a position of rest ready to commence its next cycle of movement for turning the next leaf;

Fig. 3 is a plan view similar to Fig. 2, but with the parts in operating position, namely, with the suction member represented as having moved in its cycle from the last turned leaf at the left where the cycle commences over to the leaf next to be turned at the right;

Fig. 3C is an enlarged longitudinal vertical section of the parts shown in Fig. 3B on the broken line thereof, looking in the direction of the arrows thereon;

Fig. 7 is a transverse section through the cup-like portion of the suction member and illustrating the manner in which it seizes the leaf that is to be turned with an action somewhat simulating the action of the fingers and thumb of a hand in turning a leaf of a book or the like;

We are aware that many attempts have heretofore been made to turn the leaves of books, music, or the like mechanically and that among these attempts there have been devices intended to be operated by suction imposed upon the pages or leaves through a member which is moved into leaf engaging position for the purpose of turning the leaves by the action of suction. So far as we are aware, however, none of these suction employing devices has been successful. We believe that the apparent failure of previous suction employing mechanisms to achieve a satisfactory result is mainly or in part due to the uncertainty or unreliability of action of the parts in the turning of only a single leaf at a time.

In accordance with our invention we provide a suction arm or member which engages each leaf or page to be turned in a manner somewhat simulating the motion of the thumb and fingers of the human hand in applying themselves to the face of the page (preferably near the upper right hand corner thereof) in such a way that the flat leaf or page is very slightly puckered, gathered or bent at a localized area thereof out of its own plane, thus separating it from the leaf next underneath. The said suction arm or member having thus engaged the leaf is swung through 180 degrees or thereabouts to complete its cycle, and substantially immediately upon beginning its leaf-turning movement a cooperating member or part, preferably of general pin or rod-like form, engages the turning leaf at the back thereof and in its continued movement effectively deposits the said fully-turned leaf on the last previously turned leaf. At a suitable point in the movement of the suction arm or member with the turning leaf, the suction is broken briefly. Certain other subsidiary actions also occur during or as a part of the cycle of the suction member or arm which will be described in detail, the most important of these being the turning or moving out of leaf-holding position of pin-like or finger-like devices which lie against the leaves of the open book at the bottom thereof, and which must be moved out of the way temporarily in order to permit each leaf to be successively turned, whereupon said pin-like or finger-like devices are returned to leaf holding position.

In order to provide a successfully operating device, we use a small electric motor of about one-quarter horse power, and also use a vacuum pump of a preferably rotary character, such as a Vernon rotary compressor which, when operated by the electric motor, is constantly creating and maintaining a vacuum (except as the vacuum is temporarily broken at the suction cup) so as to insure a sufficient vacuum at the cup-like end of the suction arm or member. Preferably the entire organization is such that the parts are quiescent until a button or switch is pressed, closing an electric circuit and causing the parts to go through a complete cycle during all of which cycle the electric motor is functioning and the suction pump is continuing to maintain the desired suction, except as temporarily broken at the suction cup. When the cycle has been completed, the parts are returned to a position of rest with the cup-like end of the suction member resting upon the last turned page or leaf. When another leaf is to be turned, the user of the mechanism presses the button or switch and starts a new cycle in which the said suction member moves from the upper left hand corner of the last turned leaf over to the upper right hand corner of the leaf next to be turned, lifts said leaf with the referred to puckering, gathering or bending action and with the assistance of the subsidiary finger, pin or member, which enters in behind the turning leaf, moves it over onto the previously last turned leaf.

Figures 1, 8, 9:
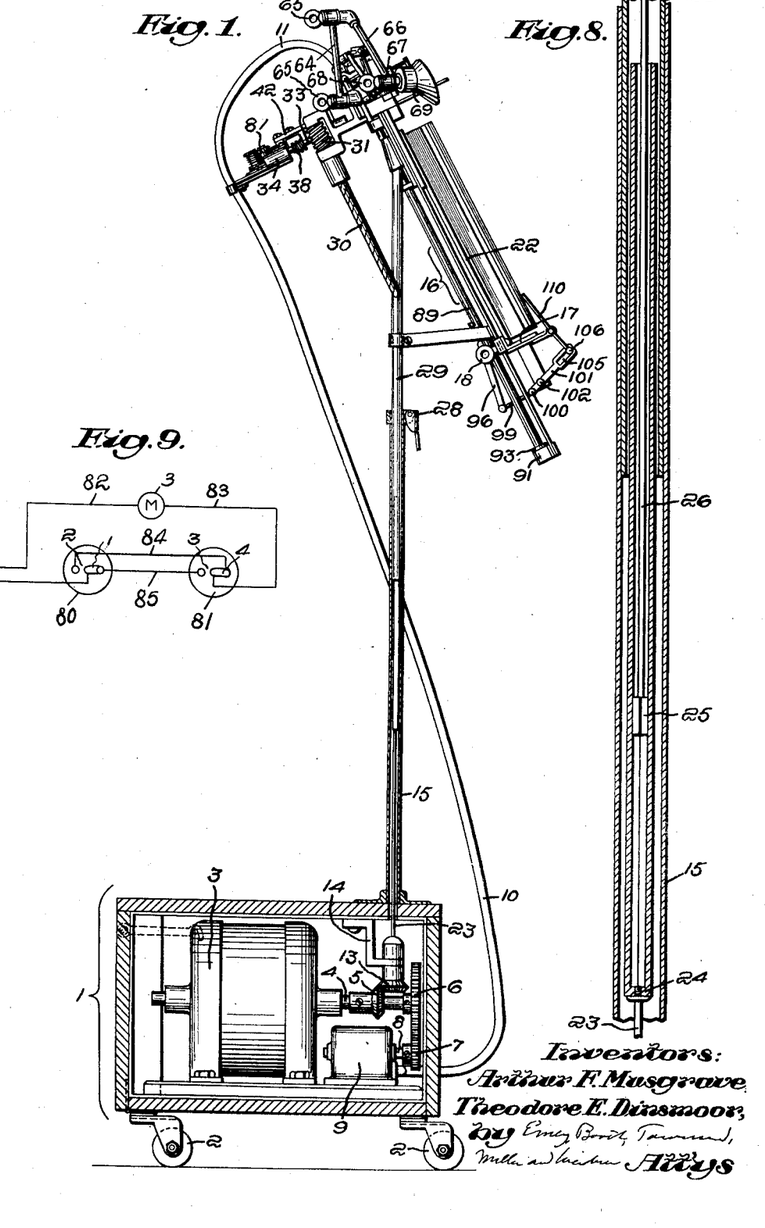
Fig. 1 is a side elevation, partly in vertical section, of a mechanical leaf turner embodying our invention.
Fig. 8 is a vertical section upon a larger scale, of a part of the tubular members supporting both the book easel or rest and the leaf-turning mechanism.
Fig. 9 is a diagram of the electric circuit employed.

Referring more particularly to the drawings, in Figs. 1 to 9 of which we have shown one embodiment of our invention, but to which the invention is not limited, we have in Fig. 1 represented a box-like base 1 desirably supported upon four wheels or rollers 2 by which it may be readily moved to any desired position of use. Within the said base 1, there is provided a suitable electric motor 3 which may be a Diehl motor of about one-quarter horse power.

In order to drive the motor, we preferably provide suitable means (not shown) for plugging into a local circuit in a well known manner, which need not be further described. The shaft of the rotary motor is indicated at 4, and thereon is fast a beveled gear 5 and another gear 6 meshing with a pinion 7 on the shaft 8 of a suitable pump 9, conveniently positioned as shown in Fig. 1. The said pump 9 is of such character as to maintain a suction constantly and may, for example, be a Vernon rotary compressor of about two inches in diameter. It must be of such capacity that the vacuum is constantly maintained in the pipes and tubes, though broken once in each cycle at the suction cup. Leading from the suction pump 9 is a vacuum tube 10 which extends upwardly as indicated in Fig. 1, and then preferably leads somewhat laterally as indicated at 11 in Figs. 2 and 3 to a metal tube 12 which, as described in detail hereinafter, leads to the suction cup or part which actually engages the leaf to be turned.

The beveled gear 5 upon the shaft of the motor 3 meshes with and drives a beveled gear 13 suitably supported by a bracket 14 within the box-like base 1.

Figures 2, 7:
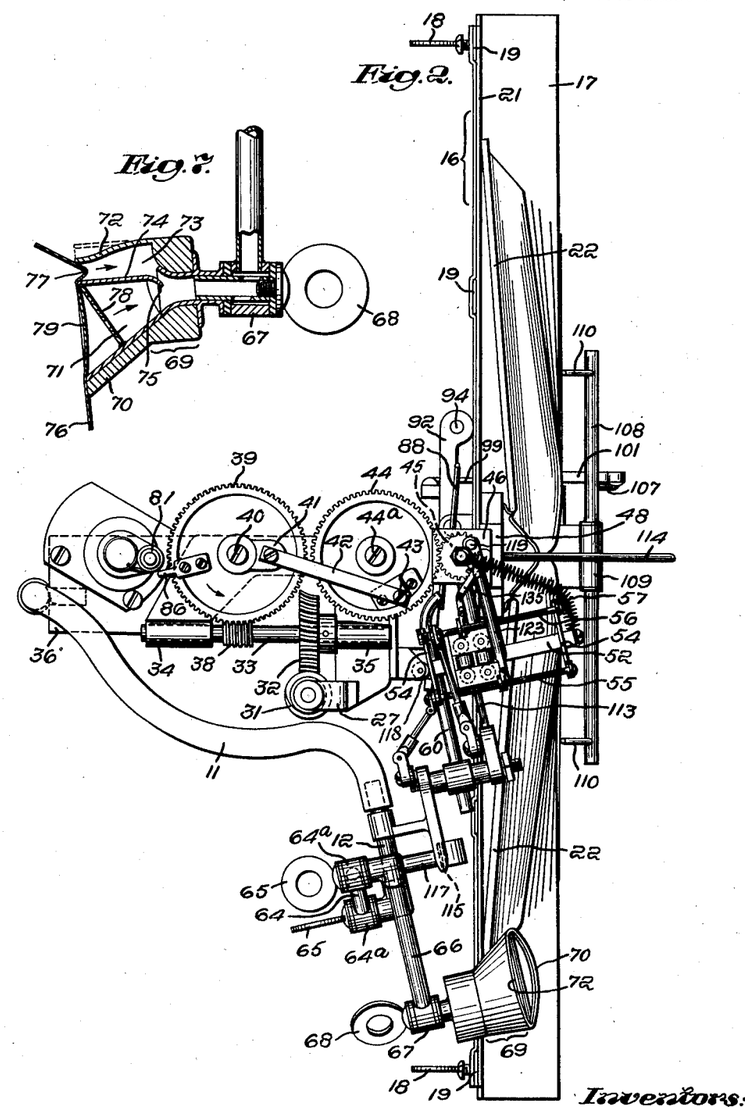
Figure 4:
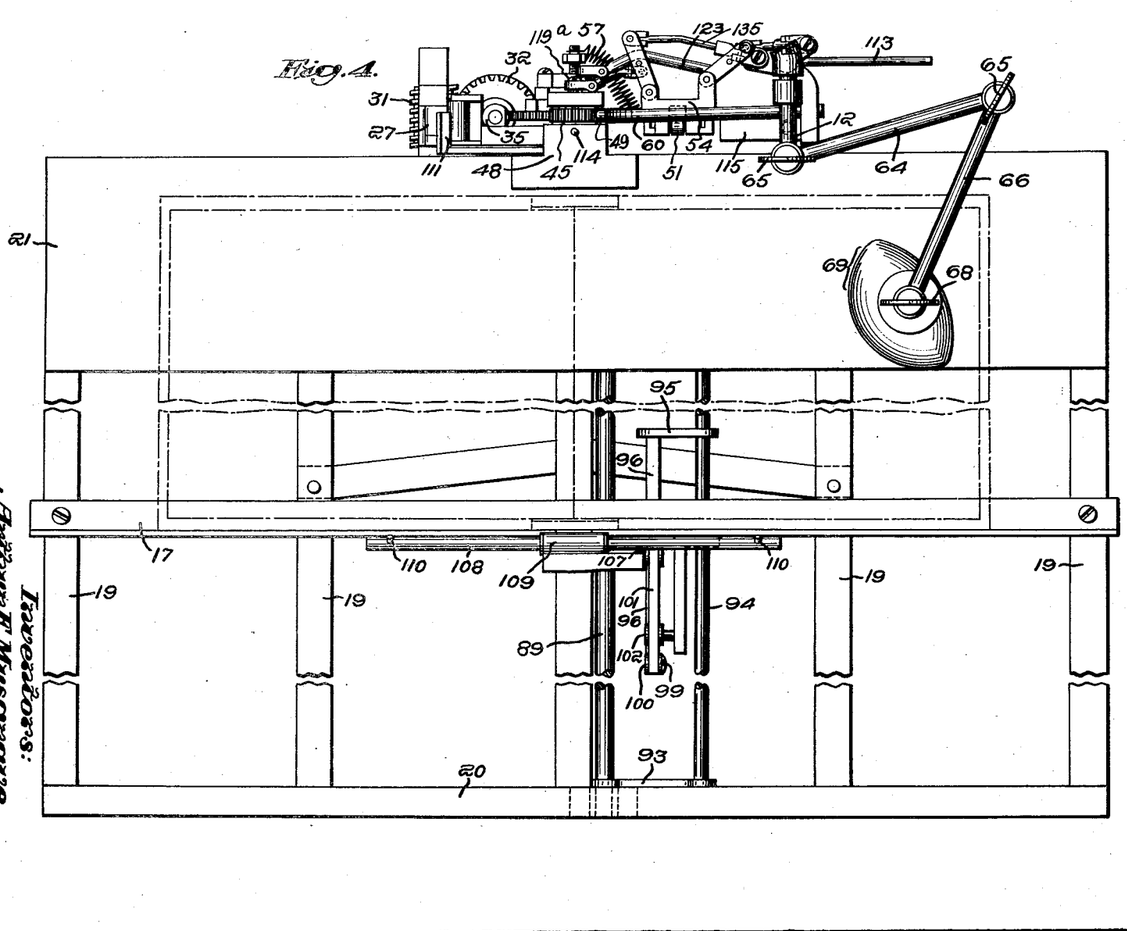
Fig. 4 is a front elevation of the mechanism, showing the suction member as having commenced its cycle and moved from the last turned leaf at the left over to the leaf next to be turned at the right.
Figure 5:
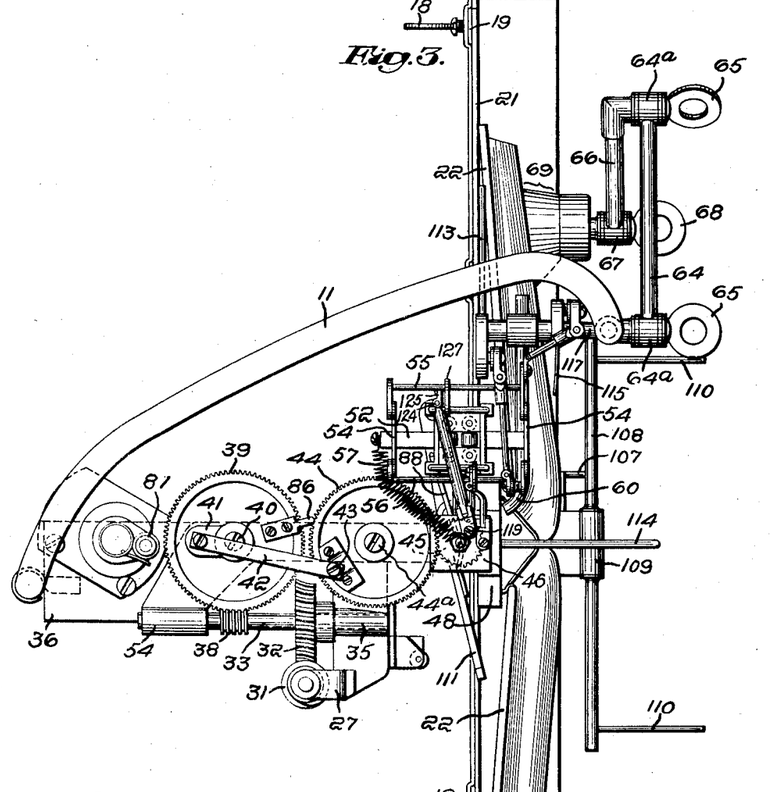
Fig. 5 is a plan view of the mechanism representing a leaf as being turned, the suction member having swung to about mid position in its movement with the leaf that is being turned.

Extending upwardly from the base 1 is a strongly constructed metal tube 15 which supports the book easel or rest, which is generally indicated at 16 in the several figures and which is itself provided with a horizontal bottom shelf 17 upon which the book or the like rests and which shelf can be adjusted up and down upon the framework of the easel to accommodate the books of different height, by means of set screws 18, 18 shown in Figs. 2, 5, and elsewhere. The said easel 16 is shown as of an open framework character, indicated best in Fig. 4, where the several rigid upright members thereof are indicated at 19, connected at their lower ends to a transversely extending bar or member 20 and at their upper ends to a similar bar or member 21, shown, however, as of greater extent vertically of the easel. Obviously, however, the easel itself may be of any suitable form or character that will readily support a book or the like, such as that indicated at 22 in Figs. 1, 2, 3 and 5.

Motion may be conveyed to the operating parts of the leaf turning mechanism from the electric motor 3 in any suitable manner, as, for example, by a flexible power-conveying tubing, but in the disclosed embodiment of the invention, we have represented in Figs. 1 and 8 a vertical shaft 23 rotated by the bevel gears 5, 13, and which (as shown most clearly in Fig. 8) is connected to the lower end of a vertical tube 24, interiorly of square or other polygonal cross section to receive a like shaped part or plug 25 that may be slid up and down in the tube 24 for effecting vertical adjustment of the driving parts. The part or plug 25 is connected to a vertical rod 26 to which rotating movement is imparted from the driven rod 23 and tube 24. At its extreme upper end, as will be described in detail, the said driven rod 26 is supported in a bracket 27, clearly shown in Figs. 2 and 3, as connected to the easel structure. In Fig. 1, we have represented at 28 a lock or clamp which is manipulated to permit an up and down adjustment of the easel support. As shown most clearly in Fig. 8, the outer tube 15 of the upright support has mounted therein in a telescoping capacity an inner tube 29. The lock or clamp 28 is located at the upper end of the outer tube 15, and by the cam part thereof engages the inner tube 29 to support the same and hence the easel 16 in any desired position of vertical adjustment.

Reference has been made to the driving rod or spindle 26. Preferably the same at its upper end is connected to a flexible shaft 30, clearly shown in Fig. 1, as extending laterally and upwardly from the said driving rod or spindle 26. It is, as stated, supported in the bracket 27 of the mechanism, and at its upper end is provided with a worm 31 which meshes with and drives a worm wheel 32, best shown in Fig. 2 as fast on a horizontally positioned shaft 33 supported in suitable tubular bearings 34, 35, themselves carried on suitable parts 27, 36 of the metal framework that is itself supported in any suitable manner, as from the upper part of the easel or from the telescopic formation that supports the easel.

Fast upon the shaft 33 is a worm 38 engaging a gear wheel 39, itself pivoted at 40 upon the said framework. The size of the gear 39 and the timing of the parts is such that the said gear 39 makes one complete revolution to one complete cycle of the leaf turning elements, and is therefore termed the cycle gear. Fast with and preferably secured to a face of the gear 39 is a bracket 41 to which is pivotally connected a link 42 pivoted at its other end at 43 to a second gear 44, itself pivoted at 44a upon the framework. The construction and arrangement are such that in each revolution of the gear wheel 39, the gear heel 44 is given an oscillation forward and back through a sufficient arc to impart the desired movement to the parts next to be described through the intermediary of the small pinion 45, shown in dotted lines in Figs. 2 and 3 and in side elevation in Fig. 4, and that is given a movement of rotation through about 180 degrees first in one direction and then in the other, so as to move the leaf turning elements through their complete cycle, which involves the turning of the suction cup or member from its position of rest shown in Fig. 2 over to the leaf-engaging position shown in Figs. 3 and 4, and back again to the position of rest shown in Fig. 2.

Figure 3A:
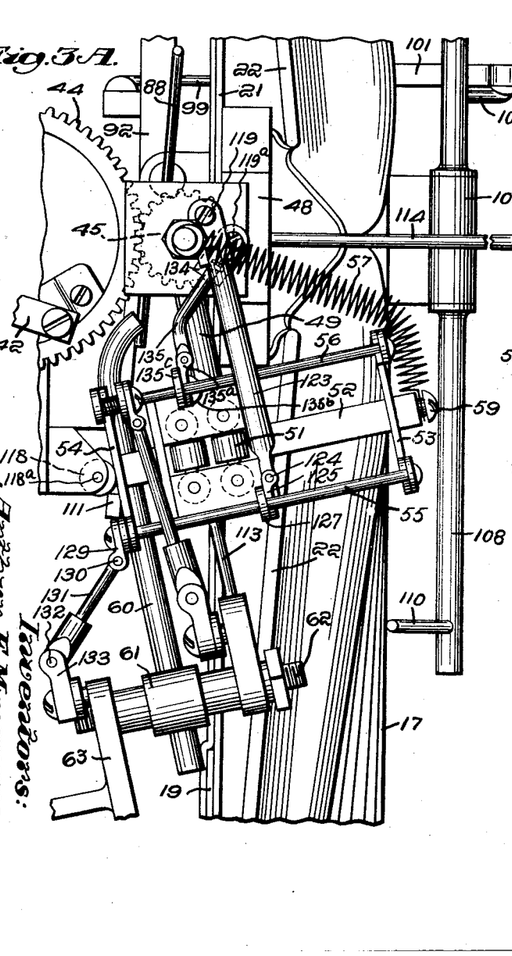
Fig. 3A is an enlarged detail view in plan of certain of the operating connections in their positions occupied when the suction member is in the position shown in Fig. 2.
Figure 3B:
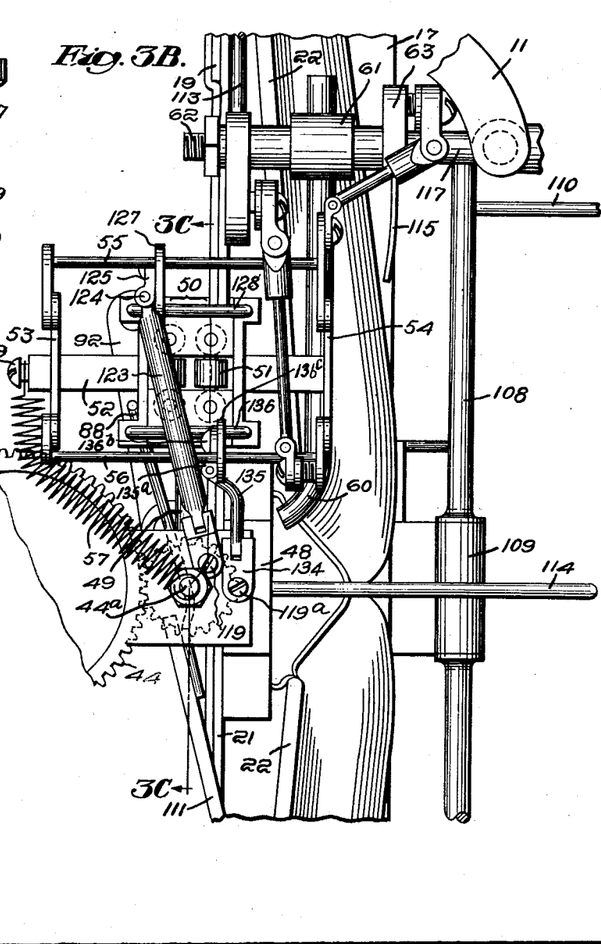
Fig. 3B is a similar view, but showing the positions occupied when the suction member is in the position shown in Fig. 3.

As shown most clearly in the enlarged details, Figs. 3A and 3B and the enlarged sectional view Fig. 3C, but shown also upon a smaller scale in Figs. 2 and 3, there is provided a square metallic block 46 directly above and overlying the pinion 45. Parallel with and beneath the said pinion 45 is a similar block indicated at 47, which is itself secured to a bracket 48 shown most clearly in elevation in Fig. 4 as secured to the bar or member 21 of the easel frame. The said pinion 45 is itself supported for oscillatory movement between the said two blocks 46 and 47. It is provided with an arm 49 rigidly secured thereto and extending laterally outwardly therefrom as indicated in Figs. 2 and 3, and in said enlarged details Figs. 3A and 3B.

Substantially all the operating parts by which each cycle movement is accomplished are supported from the said arm 49. At the outer end thereof and as most clearly shown in said enlarged detail views Figs. 3A, 3B and 3C, there is fast a hollow block-like carriage generally indicated at 50 in the several views and consisting of a generally cube-like structure in which are supported in suitable spaced relation a set of eight anti-friction or bearing rollers 51 to receive for slowly sliding compensating movement therebetween a bar 52 which is square in cross section and upon the opposite end portions whereof (as shown most clearly in Figs. 3A, 3B) are fast two yokes 53, 54 which have upturned ends that respectively receive two short parallel rods 55, 56, thus making up a cradle-shaped structure. The said rods 55, 56, support certain levers and links for conveying motion to certain parts, which will be referred to in detail at a later point in the description.

The said bar 52 is mounted for longitudinal sliding, yielding or compensating movement because it carries the suction arm or member that is to be moved at each cycle onto and so as to engage the page or face of the leaf that is next to be turned. As successive leaves are turned, the thickness of the part of the book constituting the page or leaves yet to be turned is, of course, constantly decreasing, and it is therefore desirable that the said bar 52 shall have the capacity to move in a direction that will carry the suction member constantly further inward toward the face of the easel in precisely the proper position to accomplish its purpose.

In order that the bar 52 shall at the proper times slide freely upon the rollers 51, we provide a coiled spring 57 connected to the outer end thereof at 58 and to a pin 59 upstanding from the block 46, so that the said spring is stressed during the motion of the parts, to overcome or equalize the force exerted by the unturned leaves against the suction cup and which, if not compensated for, would tend to bind the rod 52 against the rollers 51. By the described construction, the bar 52 is maintained in a condition in which it is capable of sliding at the proper times.

Upon the extreme end of the bar 52 opposite to that to which the spring 57 is connected and so as to extend inwardly above the book on the easel 16, is fast a transversely extending rod 60, shown partially in the plan views Figs. 2 and 3 and in the enlarged details Figs. 3A, 3B, 3C. Upon the said rod 60, which has another function to be explained later, is supported for lengthwise adjustment therealong a bracket 61 which has a stationary screw threaded shaft or rod 62 supported therein at right angles to the said rod 60. Upon one end of said shaft or rod 62, as shown most clearly in Figs. 3A, 3B, is supported a bracket 63 of angular form, which as there shown receives and supports a metallic tube 64 that is connected to the flexible air or vacuum hose 11, as indicated in Figs. 2 and 3. The said tube 64 has at each end a head or barrel portion 64a, 64a, permitting angular adjustment of the parts of said tube 64 by means of set screws 65, 65, clearly shown in Figs. 2 and 3, for the purpose of lengthening or shortening the range of action of the suction cup for a larger or smaller page. Pivotally mounted upon the outer end of the tube 64 is another tube 66, which at its opposite end also has a barrel shaped portion 67 in which, by means of set screw 68, the suction member that engages the pages or leaves of the book may be given a movement of rotative adjustment.

The suction member, head or cup 69 itself is shown in enlarged detail in Fig. 7, and constitutes an exceedingly important feature of the invention.

We are aware that it has been heretofore attempted, and in certain experimental work conducted by us we have attempted, to turn the leaves of a book through the aid of a suction member, the active flat or plane face whereof bears flatwise against the page or leaf for the purpose of lifting the same while the leaf is maintained flatwise in its own plane. We have found that such devices are unsatisfactory. After much experimentation, we have provided suction means which, when positioned upon the page or leaf, somewhat puckers, gathers or slightly corrugates or bends temporarily the sheet or leaf in a manner somewhat similar to the action of the fingers and thumb of a hand placed upon the page and drawn together. We have discovered that the suction acts effectively upon the leaf when it is so bent or temporarily moved out of its own flat plane.

In Fig. 7, we have shown the preferred construction of member 69 whereby the described result is secured. Therein the head or barrel-like part 67 has extending therefrom a cup-like member 69 preferably formed in part of quite soft vulcanized rubber, but having a relatively thick, unyielding wall 70 extending throughout the periphery of the larger chamber 71, while the thinner wall 72, integral with the wall 70 or structurally separate, extends about the remaining portion of the periphery of the cup to provide a chamber 73 above a partition wall 74. The said wall 74 terminates at its inner end at 75 so that the suction acts in the direction of the arrows in both the chambers 71, 73, but without a collapsing action upon the rigid wall 74, so that the sheet to be turned, which is indicated at 76, is grasped and puckered, corrugated or bent as indicated at 77. The suction chamber 71 is provided with an upright plate 78 having a series of perforations, which in the present instance are eight in number, suitably arranged, and if desired of varying size, so that the suction acts effectively therethrough and holds the leaf or pages against the mouth of the chamber 71 with a slightly inwardly bellying action, as indicated at 79.

The suction which is created through the action of the suction pump 9 is constantly maintained by it, though broken briefly once in each cycle to permit the leaf to be released, and the leaf while it is being turned is held in the very secure condition shown in Fig. 7 until the proper instant to break the suction momentarily.

If the rod 60, previously referred to, had no motion relative to the pinion, the leaf suction cup or member 69 would not approach the leaves yet to be turned at the same angle for all thicknesses of books and regardless of the number of leaves yet to be turned. In order to permit said suction cup always to approach the leaves yet to be turned at the same angle regardless of the thickness of the book or number of leaves yet to be turned, the arm 49 which is integral with and extends laterally from the pinion 45 is permitted to complete its half cycle fully, and, in so doing, as the suction cup or member 69 remains at the level or position of the leaf next to be turned, it is thus brought to its proper angle by the described completion of movement of the gear 45.

The open face of the suction member or cup 69 is not brought down absolutely flatwise against the leaf next to be turned, but the thicker part 70 of the wall constituting what may be termed a heel contacts first, and the edge of the thinner part 72 of the wall never comes completely down to the said leaf. The said leaf is lifted by the suction against the edge of said thinner part of the wall. It is in this manner that three functions are effected, namely, (a) a pressure of the heel or edge of the thicker part of the cup against the leaf, (b) the lifting of the corner of the leaf through the action of the suction a few degrees, and (c) the bending, crinkling or puckering of the leaf itself as shown in Fig. 7.

The suction cup 69 as it comes down on the leaf next to be turned is forced against the said leaf and tends to move said rod 60 outward while the pinion 45 rotates the cubical roller bearing box down to its terminal position, and the said suction cup 69 in this manner always has the same angle with reference to the leaf it is approaching. That angle may be described as follows. The suction cup 69 approaches the leaf to be turned with the solid wall 70 constituting the heel pressing down on the said leaf, and the thin flexible wall 72, being near the corner of the leaf, lifts the leaf slightly with about a 3° or 4° angle between the heel of the solid wall 70 and the flexible rubber wall 72. This action tends to give a pressure or exert a force sufficient to hold down the entire book (that is, the under leaves) at the thick wall 70, also it gives a tendency to lift up only one corner of the leaf to be turned at the flexible wall 72, and it gives a tendency to buckle said leaf corner under to ensure getting only one leaf at a time.

We have discovered in the course of our experimentation that book leaves formed of paper pulp are somewhat porous or permeable to the action of suction, and there is a very decided tendency in such cases for a suction member to lift more than one leaf at a time. It is, of course, necessary to provide means whereby always only one leaf will be turned at a time. Otherwise the mechanism does not have the necessary efficiency, and would not be acceptable commercially. By slightly puckering, gathering or bending the topmost leaf next to be turned, this difficulty is overcome and only a single leaf is turned for each cycle movement of the suction arm or member.

It has been stated that the pinion 45 which is oscillated through an arc of about 180° and back causes the described swinging movement of the suction member or cup 69. When the parts are in a position of rest and before the leaf turning cycle begins, the suction member or cup 69 occupies the position shown in Fig. 2, namely, just outside of or substantially at the upper left hand corner of the last turned leaf. Before describing the operation of certain subsidiary parts or features, such as the means for momentarily breaking the suction in the member 69 once in each cycle, the introduction of the cooperating pin or rod-like leaf turner that enters behind the leaf that is in the process of being turned, and the means for moving out of leaf-holding position the pins or rods that engage or overlie the pages of the book in open position at the bottom thereof while being read, we will describe the means for initiating the cycle movements.

For this purpose, as indicated diagrammatically in Fig. 9, we have provided an electric circuit which includes the electric motor 3, a push button or hand switch 80 and a hand switch 81 with suitable wiring indicated at 82, 83, 84, 85.

The push button or hand switch 80 is located at any suitable and convenient part of the mechanism so that it can readily be pressed by the reader whenever he wishes to turn a page of the book or the like that is being read. The pressing of the button or hand switch 80 closes the circuit through the wires 84, 83, the motor 3 and the wire 82, starting the said motor and starting the suction pump, both of which continue in operation throughout one complete cycle movement of the leaf turner elements.

The current comes into the hand switch 80, and when the latter is pressed the said switch goes from position (1) to position (2), closing the switch, the current then passing through switch 81 to the motor 3, thus starting the motor also indicated as M. When the mechanism has moved through its complete cycle, the finger, yet to be described, on gear 39 moves the switch 81 from position (4) to position (3) and opens the circuit again, and the motor stops, and then the operation is repeated again, because the next time the hand switch 80 is moved, it moves from position (2) to position (1).

The button or hand switch 80 is pressed just once to have the parts go through a complete cycle. If the operator wants to stop the parts anywhere in the midst of a cycle, he pushes the button or hand switch 80 a second time, which has the effect of moving the switch 80 from position (1) to position (2) again, and opens the circuit.

It will be assumed that the suction member 69 is approaching the position shown in Fig. 2. During the swinging movement from the position shown in Fig. 3 to that shown in Fig. 2, a projection or lug 86, shown in Figs. 2 and 3 as secured to a face of the gear 39 and to which we have just referred, comes in contact with the switch 81, which is indicated in Figs. 2 and 3 in sufficient detail, to move the said switch to position (3) shown in Fig. 9.

Of the three movements which are subsidiary to the actual leaf-turning movement of the suction member or cup 69, we will first describe the structure employed to hold the pages or leaves of the book open and which must be moved away from their holding position in order to permit a leaf to be turned. For this purpose, we have provided the following mechanism which is illustrated clearly in Figs. 1, 2, 3 and 6.

Figures 5, 5A, 6:
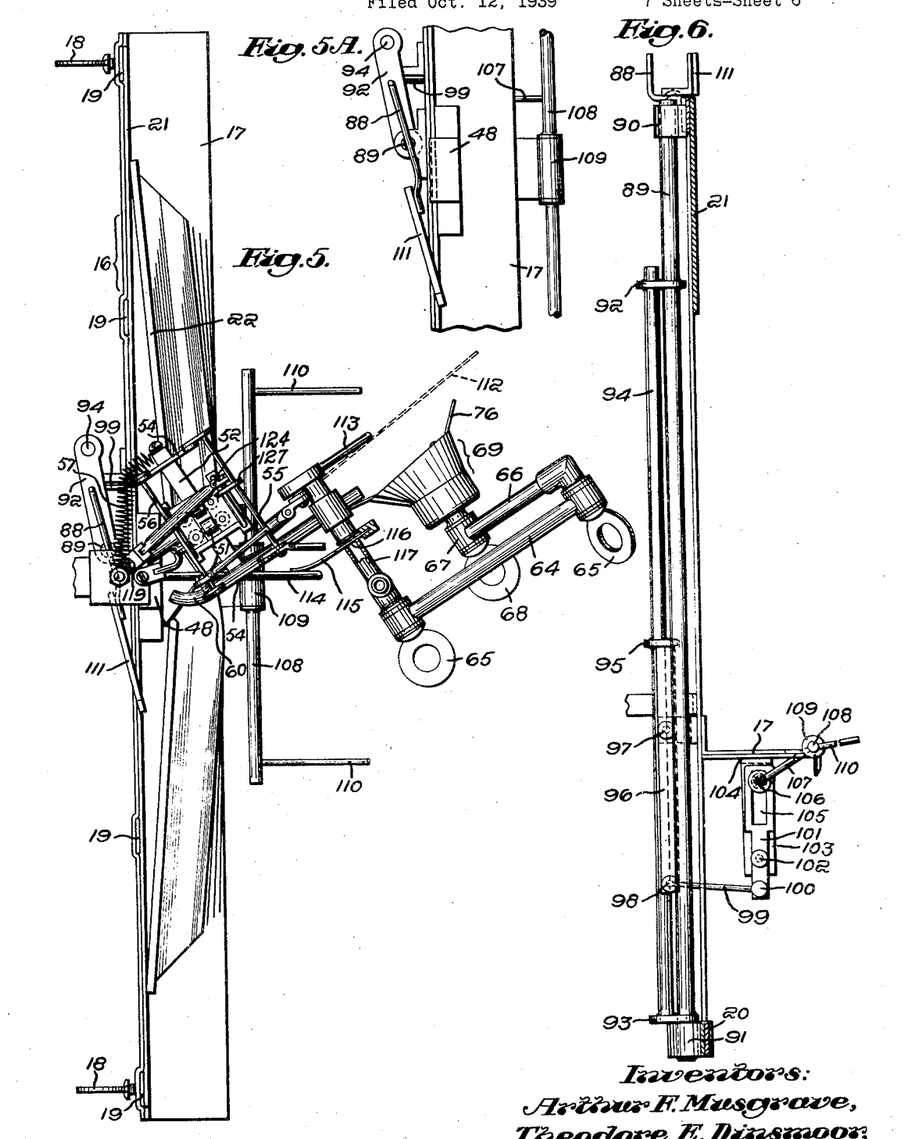
Fig. 5A is a detail mainly in plan view, showing certain of the parts for controlling the movements of the page holding pins or fingers.
Fig. 6 is a vertical section of a portion of the mechanism and particularly representing one of the sets of said pins or fingers for holding all the pages in open position by engaging them at or near the bottom thereof and the operating parts for said fingers.
Figure 5C:
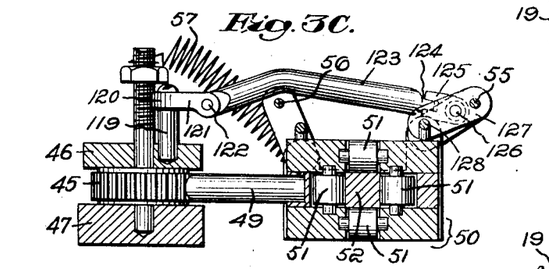

When the user of the mechanism presses the button or hand switch 80 so as to initiate a new cycle, the suction cup 69 is thereupon swung through an arc of about 180° to the position shown in Figs. 3 and 4. Substantially when it reaches said latter position, a part of the swinging structure and preferably the block 46 above the pinion 45 strikes against a movable part to cause the page holding pins or fingers to be removed from their page-holding position. For this purpose, we have provided, as best shown in Figs. 5, 5A and 6, a horizontally arranged lever, one arm of which is indicated at 88. The said lever having the arm 88 is fast upon the upper end of an upright rod 89 that is supported for rocking movement in upper and lower bearings 90, 91, upon the back of the easel body. Fast to and extending laterally from the said upright rod 89 are upper and lower arms 92, 93, that receive and support a second upright rod 94 in parallelism with the rod 89.

At a suitable point upon the vertical rod 94 is received a bar 95, best shown in Figs. 4 and 6, it having an opening in its end through which the bar 94 passes with some slight freedom of play. The other end of said bar 95 is secured to the upper end of a vertically positioned lever 96 (Figs. 4 and 6) pivoted at 97 upon a bracket at the back of the easel, having connected to its lower end at 98 a link 99 which, at its other end 100, is connected to a lever 101 pivoted at 102 in a depending bracket 103. Said bracket at its upper end is secured at 104 to the under side of the shelf 17 of the easel that receives the book or other matter the leaves of which are to be turned. The said lever 101 has its upper end longitudinally slotted as indicated at 105 to receive a roller-like head 106 of a lever 107. The said lever 107, as most clearly shown in Figs. 2 and 3, is formed at its pivotal portion as a long horizontally supported bar 108, the bearing for which is positioned centrally thereof at 109. Upstanding from the opposite end portions of said bar 108 are two or more pins or fingers 110 that constitute the open page-holding members.

The construction of parts is such that when the suction cup or member 69 reaches the position shown in Figs. 3 and 4, the lever end 88 (Fig. 5) is struck by the block 46, with the result that through the described connections the holding pins or fingers 110, 110 are swung outward and downward into the position shown in Figs. 5 and 6, thereby permitting the suction cup 69 to turn the leaf which it engages in the manner already described and indicated in Fig. 7. When the said suction cup or member 69 has completed its cycle (that is, has been returned to the position shown in Fig. 2), the opposite arm 111 of the lever having the arm 88, already referred to, is struck by the block 46, now at the other end of its travel, and through the connections already described the pins or fingers 110 are moved back into the book-holding or page-holding position shown in Fig. 2.

We have stated that at a certain time during the movement of the suction cup or member 69 from the position shown in Figs. 3 and 4 to that shown in Fig. 2, the suction is momentarily broken so as to permit the leaf that has been lifted by the said suction cup or member 69 to be moved to its completely turned position by a subsidiary member which enters behind the partly turned leaf and in its further movement completely turns the said leaf and deposits it upon the previously turned leaves. The mechanism for this purpose is clearly shown in Fig. 5, wherein the suction member or cup 69 is represented as in about midposition. There the leaf 76 is represented as still gripped or held by the suction that is still maintained in the suction cup or member 69. We have at 112 indicated in dotted lines the position of the leaf when it has been released by the momentary breaking of the suction, so that the subsidiary pin or finger-like member shown at 113 receives or contacts with the back of the leaf, and in the further turning movement of the mechanism brings the said leaf into the fully turned position. It is, however, first necessary to break or relieve the suction momentarily, and this is done by means of a finger or member 114, the means for operating which will be described at a further point.

The said finger 114 comes, at the proper time in the return swinging movement of the suction cup and cooperating parts toward the position shown in Fig. 2, into engagement with a small plate spring 115 which acts as a valve to close the open end 116 of a tube 117 which is in communication with the interior of the suction cup or member 69 through the pipe structure 64, 65, etc. When the said spring valve 115 is moved away from the open end 116 of the tube 117, the vacuum is temporarily broken or relieved in the suction cup or member 69, and the leaf 76 is released from the gripped position shown in Figs. 5 and 7, so that said leaf moves into the dotted line position shown in Fig. 5 against the pin-like member 113.

Before describing in detail the connections for operating at the proper time the finger-like leaf pusher that enters in behind each turning leaf, and the means for momentarily breaking the suction once in each cycle, we will refer to several minor features or details.

Referring first to the structure of easel-like book support, it will be understood that an important purpose in making the upper cross member 21 thereof greater in height than other cross members thereof is to provide an effective backing or support against which the leaves of the book are supported solidly when the suction member 59 comes into contact with the topmost unturned leaf. If the bar or member 21 were not sufficiently great in height when positioned, the leaves might be buckled in when the pressure of the suction member comes against the same.

Reference has been made to the bar 95, shown in Figs. 4 and 6 as having an opening through which the bar 94 passes with some freedom of play. The purpose of this is mainly to permit the shelf 17 of the easel to be adjusted up and down by the set screws 18 to accommodate books or other leafed material of different length of pages. Thus, regardless of the level to which the shelf 17 is adjusted, the page-holder fingers or pins 110 will be moved out of holding position at the proper time in each cycle of movement.

It has been stated that the suction arm, comprising as it does the two tubular parts 64, 66 jointed at 65, can be readily set to function correctly with any size of page. It will be observed viewing particularly Fig. 1, that when the suction cup 69 is in its position of rest before commencing a cycle, it is supported substantially above (that is, beyond) the upper left hand corner of the last turned leaf. This is also indicated in Fig. 2. In the movement of the said suction cup 69 with the turning page, the said cup moves in substantially a horizontal curved path about the pinion 45 as a center, but when it almost reaches its extreme positions at the left, it finally moves quite abruptly upward into the position shown in Fig. 2, so as to be above (that is, beyond) the turned leaves. In its movement in the opposite direction in commencing its next cycle, this motion of parts is reversed. It is, of course, evident that the leaf-turning member or arm and the operating mechanism therefor overhangs the leaves when the hook is on the easel-like support and the pinion 45 is mounted directly over the center of the book at the upper edge of the easel.

It is to be understood that the operating mechanism may be enclosed in part at least by any suitable housing, and particularly the part thereof which is supported by the upright standard at the back of the easel. If desired, a supplemental housing may be provided over a part at least of the oscillating arm or member, but in such manner as not to interfere with the proper movements thereof. It will be observed that the oscillating arm or member that swings from the pinion 45 is positively moved in both directions. It is also to be understood that the suction member or cup is so constructed and operated that it turns one leaf only whatever the thickness of the individual leaves be. In practice, it operates with equal efficiency whether the leaves be exceedingly thin and very smooth or whether they be somewhat porous and rough as in the case of paper made from wood pulp.

It will also be understood that the construction of parts is such that the page holders 110 can be manually moved out of page-holding position if desired at any time so that the leaves of the book may be turned backward.

Having thus referred to certain details of construction, we will now refer to the leaf-pushing member that cooperates with the suction member, and also to the breaking of the suction in each cycle, and to the operating means for such parts. What we term the leaf pusher is preferably of the form of a long finger or pin, and it is represented at 113 in Figs. 4, 5, etc.

We have in a previous portion of the specification referred to the leaf pusher as 113 and the member that breaks the suction as 114. We have also referred to the carriage 50 having bearing rollers 51 to receive the sliding bar 52 whereon are yokes 53, 54 to support parallel rods 55, 56, thus making a cradle-like structure that is capable of an in and out movement in a direction transverse to the rod 49, best shown in Figs. 3A, 3B and 3C.

The purpose of the sliding carriage structure may be best described as follows: When the swinging arm or member carrying the suction cup 69 is brought around from its position at the left at the beginning of its cycle onto the mass of unturned leaves lying at the right, and the suction cup 69 actually contacts with its heel portion with the uppermost unturned leaf, the small pinion 45, depending more or less upon the thickness of the mass of unturned leaves, has not as yet completed its turning movement which it must do because it is in direct mesh with the gear 44 that is driven from the cycle gear 39. In order to permit the said pinion 45 to complete the turning movement that is imposed upon it from the cycle gear 39, the bar 52 of the carriage structure slides upon its roller support 51, already described, in a smooth easy manner. It is to be noted that until the said pinion 45 has entirely completed its turning movement in a contraclockwise direction, the open mouth of the suction cup 69 had not presented itself at the proper angle to the book.

The part of the book that is as yet unturned may consist of only a few leaves, or it may consist of a thick mass of leaves. Whichever be the case, the mouth of the suction cup 69 always presents itself at just the proper angle to the uppermost unturned leaf. At the other end of the swinging movement of the suction arm or member (namely, when it returns to its position just above the mass of already turned leaves), the said sliding bar 52 of the carriage structure resets itself because the arm structure comes in contact with a stationary part, as will be described. The only function performed by the said sliding bar 52 at the end of the cycle movement is to reset itself so that when the suction arm moves in its next cycle the said sliding bar 52 is in a position to yield when arriving at the topmost unturned leaf, so as always to present the face of the suction cup 69 at the same unvarying angle to the topmost unturned leaf, no matter how many leaves as yet unturned there may be beneath the topmost unturned leaf.

From the foregoing description, it will be understood that when the entire swinging arm or member is at the beginning of its cycle, the said bar 52 has been moved completely back through the set of bearing rollers 51. As the suction cup 69 approaches the topmost unturned page, the said bar 52 moves to the proper position to insure the suction cup 69 coming against the face of the topmost unturned leaf at the angle shown in Fig. 3, and as the said bar 52 travels with the other parts of the suction arm or member to the turned-leaf position, the said bar 52 is caused to be forced back through the set of bearing rollers 51, because of the fact that the previously referred to bar 60 with curved end, shown in Figs. 2 and 5, is forced against a small roller shown at 118 as supported upon the stationary part of the structure at 118a. The small pinion 45, however, continues to take its full movement at the close of the complete cycle of movement, so that the parts may be in a position to pick up a new leaf at the proper height. That is to say, at the end of each cycle the sliding bar 52 must be moved as far as possible, so that when the parts come around again in the next cycle to engage the topmost unturned leaf, the suction cup 69 is permitted to come down onto that topmost unturned leaf wherever it may be and regardless of the thickness of the mass of unturned leaves.

The leaf pusher 113 is best shown in Figs. 3 and 4. It will be assumed that the said leaf pusher is at the extreme right of its movement, namely, when the cycle is one half completed. At that time the said leaf pusher 113, which has the form of a long finger or pin, extends in a horizontal direction above the top of the leaves of the book. As the suction cup 69 begins to lift and has slightly lifted by suction the uppermost unturned leaf, the said leaf pusher through the mechanical connections yet to be described begins to swing downward in a nearly vertical plane behind the leaf that is being turned, and this swinging motion is continued so as to complete the turning movement of the leaf. The suction at the mouth of the suction cup 69 is broken at substantially mid position in the swinging movement of the said suction cup or member from right to left, namely, when it has reached about the position shown in Fig. 5. From substantially prior to this point and onward, and substantially before the suction is actually relieved, the said leaf pusher is in contact with the back side of the leaf, and in the continuation of its swinging movement said leaf pusher completes the turning of that leaf, laying it smoothly onto the previously turned leaves and then sweeps upward into a horizontal position which it maintained until the parts start upon the next cycle.

It has been stated that the suction is broken in each cycle by a finger 114 coming into engagement with a plate spring 115 acting as a valve to close the end of the tube 117 which is in communication with the interior of the suction cup or member 69. As is evident from Fig. 5, the said finger 114 engages with said valve 115 when the parts are in the position shown in that figure.

It will be evident that means must be provided whereby at the proper time in each cycle the said leaf pusher must be operated and whereby the suction must be broken. While for this purpose we may provide any suitable means, we have preferably provided the following construction, and for that purpose we will refer more particularly to Figs. 3A, 3B and 3C, which taken in connection with Figs. 4 and 5 will make the construction of parts clear.

It is evident from the said figures and from the foregoing description that the center of motion of the suction arm or member having the suction cup 69 and the parts immediately cooperating therewith is the axis of the small pinion 45. In Figs. 3A, 3B and 3C are indicated two stationary pins 119, 119a set in and upstanding from the upper face of the block 46 which has been described as just above and parallel with the pinion 45, and in such a manner as to be off-center or eccentric with respect to the axis of the pinion 45. When, therefore, the pinion 45 is oscillated from the cycle gear 39 and swings the arm 49 and all the parts carried thereby, and which constitute the suction arm or member, any parts that are operatively connected to the said pins 119, 119a will move relatively to the swinging movement of the said arm 49, thus having certain movement of their own. We have taken advantage of this fact to provide the proper motions for the leaf pusher 113 and the finger 114 that breaks the suction, and the upsweeping movement of the suction cup 69. We have provided the following connections to which, however, our invention may be in no wise limited.

Upon the said pin 119 is pivotally connected at 120 a link 121 to which is pivotally connected at 122 a longer link 123 which at 124 is pivotally connected a short link 125 that is itself pivoted at 126 to another link 127 pivotally supported at its lower end upon a short rod 128 having downturned ends received in suitable sockets or supports in the cube-like structure 50, as best shown in Figs. 3B and 3C. The link 127 at its other end is received on the longitudinally extending rod 55 of the cradle structure already described.

At the end of the rod 55, which is supported in the yoke 54 and is toward the bottom of the sheet containing Fig. 3A, said rod 55 has fast thereon a projection 129 which at 130 is pivotally connected to a link 131 and at 132 is connected to another link 133 upon the angularly shaped bracket 63, already described as supporting the metallic tube 64 which, with the tube 66, carries the suction cup 69.

The pin 119a, best shown in Figs. 3A and 3B as the other eccentrically positioned pin, has pivotally connected thereto a link 134 (Fig. 3B). That is connected to a link 135 which at its upper end is connected to a link 135a, itself pivoted at 135b to still another link 135c, which at its upper end is received upon the rod 56 of the cradle construction, and at its lower end is supported on another short rod 136, which has downturned ends to be received in the tube-like structure 50, as shown in Fig. 3B, so that the two short rods 128, 136 are supported in parallelism.

From the foregoing description, it will be evident that since the whole leaf-turning unit rotates about the axis of the pinion 45 as a center, and since the two pins 119, 119a, are mounted eccentrically with respect to the axis of the pinion 45, and since the parts of the linkage thereof are of unvarying respective lengths as the swinging motion of the entire suction arm or member begins, the rods 55, 56 of the cradle structure are moved bodily toward and from each other, and in their movements move the parts connected thereto. The pulling action upon the rod 55 will cause the swinging sharply upward of the suction cup 69 of the suction arm or member at the end of the cycle movement, to the position somewhat above the upper left hand corner of the turned leaves (that is, to the position shown in Fig. 2). Another part of the linkage gives the proper movements to the leaf pusher and the suction is relieved at the cup at the proper time.

The connections through the rods 55, 56 are desirably and necessary in the disclosed construction of the invention because the effective length of the carriage is being changed with every cycle as already described, and therefore the described movements are not given directly through the carriage.

Referring again briefly to the circuit shown in Fig. 9, the switch indicated generally at 81 is a single-pull double-throw switch. In the construction employed, but to which our invention is not limited, instead of having to move the switch in both directions, in order to get the two throws, the switch arm is connected to a three-point rotary contact, whereby when the switch arm is swung in a single direction only, it contacts at first with one set of contacts, taking its initial position by the action of the springs of the switch, and in continuing in that direction it slides over the contacts and does not move them. The next time the switch 81 is to be moved, it is pushed in the same direction and again causes the contacts to move into the second position. Preferably the switch 80 is of the same construction. Our invention, however, is not limited to such type of switches.

Figure 10:
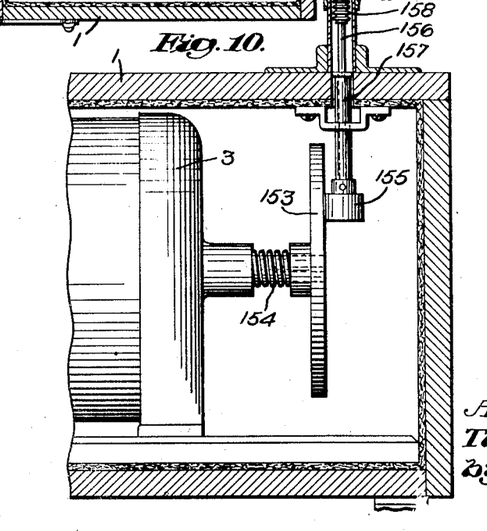
Fig. 10 is a vertical section upon a larger scale than Fig. 1 of a substitute or modified form of driving mechanism by which the speed of operation may be quickly changed from time to time as desired, the leaf turning mechanism and the book easel being omitted.
Figure 11:
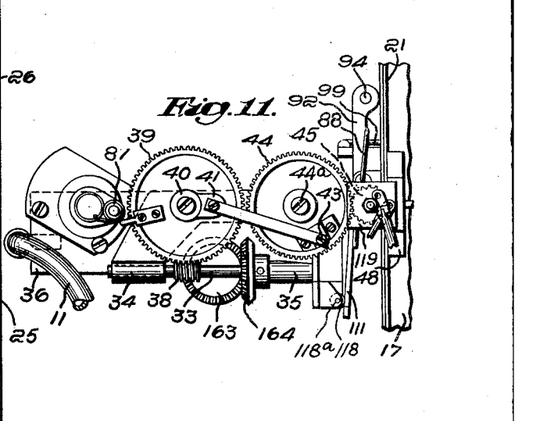
Fig. 11 is a detail showing in plan a part of the leaf turning mechanism when using the variable speed drive shown in Fig. 10.
Figure 12:
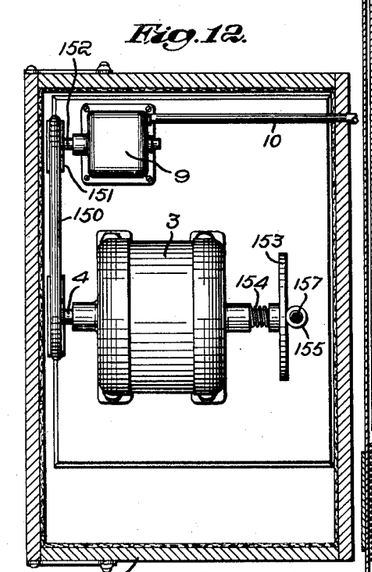
Fig. 12 is a detail in horizontal section through the box-like base which encloses the electric motor and the vacuum pump as arranged when using the variable drive shown in Fig. 10.

In Figs. 10, 11 and 12, we have represented a somewhat modified form of drive for the operating parts, but excepting in the features there illustrated, the structure is desirably the same as that shown in Figs. 1 to 9 inclusive. Wherever the same parts are shown in Figs. 10, 11 and 12 as in Figs. 1 to 9, the same reference characters are employed and therefore such indicated parts need not be particularly referred to in describing the said modification.

The electric motor 3 may be positioned upon a suitable solid support within the box-like base 1, and the shaft 4 thereof is preferably connected by a belt drive 150 with a pulley 151 upon the shaft 152 of the suction pump 9, which, in the form of drive herein shown, may conveniently be located at one side of the motor 3, instead of beneath the shaft thereof as in Fig. 1. From the said suction pump 9 extends the vacuum hose 10 connected to the suction arm or member in the manner already described in connection with Figs. 1 to 9.

The shaft 4 of the electric motor 3 has mounted thereon so as to turn therewith a driving disk 153 which is, however, at all times pressed outward by a coiled spring 154 against a small roller or smooth-faced pinion 155 fast upon a vertical shaft 156 that is supported in a long tubular bearing 157 extending through and supported at the upper wall of the box-like base 1. It is evident that by moving the roller or pinion 155 outward from the axis of the driving disk 153, the speed of rotation of the said roller or pinion 155 is increased, and conversely it is diminished when said roller or pinion is moved inward or downward toward the axis of the said driving disk 153.

The said shaft 156 (the upper connections whereon need not be particularly referred to, as they are desirably the same as those shown in Fig. 2) is provided with a circular rack 158 with which meshes an arcuate or partial gear 159 pivotally mounted at 160 in a suitable bracket 161 on the outer tube 15 and having a handle 162 by which it may be turned sufficiently in either direction to move the roller or pinion 155 from or toward the axis of the driving disk 153, thereby increasing or decreasing the speed of movement of the leaf-turning parts, thus changing or varying the length of the cycle of the leaf-turning arm or member. In any position of adjustment, the teeth of the circular rack 158 mesh with the teeth of the partial gear 159 without affecting the position of the parts.

When employing the variable speed means shown in Figs. 10 and 12, we preferably do not employ the worm and worm wheel reducing gearing 31, 32, shown in Fig. 2, as to do so would render too slow the movement of the parts. Instead, we substitute for the worm 31 on the upper end of the driving shaft shown in Fig. 2 a beveled gear 163 which is fast thereon and meshes with and drives a beveled gear 164 upon the shaft 33, which through the worm 38 imparts a single movement of rotation to the cycle gear 39 for each cycle of the suction arm or member in the manner already described. The other parts of the gearing shown in Fig. 11 may be and preferably are the same as those shown in Fig. 2 and elsewhere, and therefore need not be further described.

Having thus described one illustrative embodiment of the invention and a modification thereof, it is to be understood that although specific terms are employed, they are used in a generic and descriptive sense and not for purposes of limitation, the scope of the invention being set forth in the following claims.

We claim:

1. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having a part to engage the leaf by suction, a cycle-gear driven in one direction by said motor through one revolution of such gear for the accomplishment of each cycle of the leaf-turning elements; said swingable suction member or arm having a toothed element at its axis of swinging movement; means to drive said toothed element from said cycle-gear and means mounted for movement with said suction member or arm and operated from said cycle-gear to relieve briefly the said suction once in such cycle-movement.

2. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having the part that engages the leaf by suction provided with means to bend or crinkle or deflect out of its own plane each leaf in commencing the turning action thereof.

3. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm, the part whereof that applies the suction to the leaf having means to press upon a portion of the leaf while said leaf is flat against the underlying upturned leaves, and also having means to bend or crinkle or deflect out of its own plane an adjacent part of the topmost unturned leaf, to facilitate the turning of the said leaf.

4. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having a part to engage the leaf by suction, the said part including a suction cup provided with a plurality of chambers against the open end of which a small area of the leaf is drawn by the suction and is bent or deflected out of its own plane.

5. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having a part to engage the leaf by suction, the said part including a suction cup provided with a plurality of chambers against the open end of which a small area of the leaf is drawn by the suction and is bent or deflected out of its own plane, said suction cup also having a heel-like portion that is adapted to be pressed against the mass of unturned pages.

6. Leaf turning mechanism having a swingable suction member or arm provided with a part to engage the unturned leaf by suction, said part having means for accentuating the effect of the suction at a portion thereof, thereby bending, crinkling or deflecting out of the plane of the leaf the portion of the leaf where the suction effect is so accentuated.

7. Leaf turning mechanism having a swingable suction member or arm provided with a part to engage the unturned leaf by suction, said part having means to press upon a portion of the leaf while said leaf is flat against the underlying unturned leaves and also having means to bend or crinkle or deflect out of its own plane an adjacent part of the topmost unturned leaf, to facilitate the turning of the said leaf.

8. Leaf turning mechanism having a swingable suction member or arm provided with a part to engage the unturned leaf by suction, the said part including a suction cup provided with a plurality of chambers against the open end of which a small area of the leaf is drawn by the suction and is bent or deflected out of its own plane.

9. Leaf turning mechanism having a swingable suction member or arm provided with a part to engage the unturned leaf by suction, the said part including a suction cup provided with a plurality of chambers against the open end of which a small area of the leaf is drawn by the suction and is bent or deflected out of its own plane, said suction cup also having a heel-like portion that is adapted to be pressed against the mass of unturned pages.

10. Leaf turning mechanism having a swingable suction member or arm provided with a part to engage the unturned leaf by suction, and also having a movable leaf-pushing member co-acting with the suction member or arm and means to cause said leaf-pushing member to enter in behind the leaf that is being turned before the leaf reaches an upright position, thereby to complete the turning thereof.

11. Leaf turning mechanism having a swingable suction member or arm provided with a part to engage the unturned leaf by suction, and also having a movable leaf-pushing member co-acting with the suction member or arm and means to cause said leaf-pushing member to enter in behind the leaf that is being turned during the lifting movement of said leaf, thereby to complete the turning thereof, and means temporarily to relieve the suction at the leaf during the turning movement of the said member or arm.

12. Leaf turning mechanism having a swingable suction member or arm provided with a part to engage the unturned leaf by suction, said member or arm consisting of a plurality of parts jointed together so that the effective length of the member or arm may be readily changed to accord with the size of the leaf to be turned.

13. Leaf turning mechanism having a swingable suction member or arm provided with a part to engage the unturned leaf by suction, gearing means to swing said arm or member to and fro, said member or arm including a yielding portion mounted to yield upon leaf-engagement in a direction away from the open leaf that is next to be turned, thereby to permit the said part that engages the leaf to contact with the mass of unturned leaves yieldingly.

14. Leaf turning mechanism having a swingable suction member or arm provided with a part to engage the unturned leaf by suction, a cycle gear to swing said member or arm, to and fro in one cycle movement thereof, power means to rotate said cycle gear in one direction through one revolution for each complete to-and-fro cycle movement of said member or arm; leaf-pushing means for engaging the turning leaf at the under face thereof; means for temporarily relieving the suction at a part of the leaf-turning cycle; and means operatively related to said cycle-gear to operate during each such cycle-movement said leaf-pushing means and said suction-relieving means.

15. Leaf turning mechanism having a swingable suction member or arm provided with a part to engage the unturned leaf by suction, a cycle gear to swing said member or arm, to and fro in one cycle movement thereof, power means to rotate said cycle-gear in one direction through one revolution for each complete to-and-fro cycle movement of said member or arm; said suction member or arm having means to crinkle or bend out of its plane by suction a small area of the leaf to be turned; leaf-pushing means to engage the opposite face of the leaf to be turned; and means operatively related to said cycle-gear to operate during each such cycle-movement, said crinkling or bending means and said leaf-pushing means.

16. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having a part engaging the leaf by suction, a cycle-gear driven by the motor in one direction through one revolution for each complete swinging movement of said member or arm, and geared to said suction member or arm to impart a complete swinging movement thereto for each such revolution of said cycle-gear, and leaf holding means to hold the open leaves near the bottom thereof.

17. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having a part engaging the leaf by suction, a cycle gear driven by the motor in one direction for each complete swinging movement of said member or arm, and geared to said suction member or arm, and leaf-holding means to hold the open leaves near the bottom thereof, together with means to move said leaf holding means out of their holding position to permit the leaf that is being turned to be deposited in a fully turned position.

18. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having a part engaging the leaf by suction, a cycle gear driven by the motor in one direction for each complete swinging movement of said member or arm, and geared to said suction member or arm, and leaf-holding means to hold the open leaves near the bottom thereof, together with means to move said leaf holding means out of their holding position to permit the leaf that is being turned to be deposited in a fully turned position, said means including a lever, the arms whereof are adapted to be engaged by the structure of the swinging arm or member at substantially both ends of the swing movement thereof.

19. Leaf turning mechanism having a swingable suction member provided with a part to engage the unturned leaf by suction, motor means having a gear to swing said member, and having means to apply suction at said leaf engaging part thereof, said member having intermediate its ends a part that is yieldingly slidable in a direction transverse to the lengthwise extent of said member, whereby said leaf engaging part will in action accommodate itself to the depth of the mass of leaves yet to be turned.

20. Leaf turning mechanism having a swingable suction member provided with a part to engage the unturned leaf by suction, a driven gear, a gear meshing therewith and located at the pivotal point of said member, an arm extending laterally from said last mentioned gear and whereon the parts of said member are supported, and a carriage-like structure having relatively slidable parts, constituting a portion of said member between the ends thereof and functioning to cause the part that engages the leaf by suction to be presented yieldingly to the mass of unturned leaves.

21. Leaf turning mechanism having a swingable suction member provided with a part to engage the unturned leaf by suction, a driven gear, a gear meshing therewith and located at the pivotal point of said member, an arm extending laterally from said last mentioned gear and whereon the parts of said member are supported, and a carriage-like structure having relatively slidable parts, constituting a portion of said member between the ends thereof and functioning to cause the part that engages the leaf by suction to be presented yieldingly to the mass of unturned leaves, and means to reset said carriage-like structure at the opposite end of the swinging movement.

22. Leaf turning mechanism comprising a swingable member having a part to engage the unturned leaf, means to apply suction to the unturned leaf at said part of the swingable member, power means to swing said member through substantially 180° and return, a leaf pusher supported by said member and adapted to enter in behind the leaf that has been lifted by suction, so as to participate in completing the turning of said leaf, and means operated by said power means to give said leaf pusher a sweeping motion in a downward and then upward curved path in contact with the back of said leaf, so that said pusher thereby first enters behind the leaf to be turned and then withdraws itself from the leaf when the turning thereof is completed.

23. Leaf turning mechanism comprising a swingable member having a part to engage the unturned leaf, means to apply suction to the unturned leaf at said part of the swingable member, power means to swing said member through substantially 180° and return, a leaf pusher supported by said member and adapted to enter in behind the leaf that has been lifted by suction, so as to participate in completing the turning of said leaf, and means operated by said power means to give said leaf pusher a sweeping motion in a downward and then upward curved path in contact with the back of said leaf, so that said pusher thereby first enters behind the leaf to be turned and then withdraws itself from the leaf when the turning thereof is completed, together with means to relieve the suction on the leaf shortly after the leaf pusher enters in behind the leaf.

24. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having a part that engages the leaf by suction, said part being provided with a portion holding, by such suction, the engaged area of the leaf in the plane thereof and also having a portion at which by such suction an adjacent area of the leaf is sucked out of its plane, thereby producing a bend or crinkle at such adjacent area.

25. Leaf turning mechanism including in combination, a base having motor and suction means, a standard extending upward from said base and having means for conveying power to the operating parts, an easel-like support mounted upon the standard and leaf turning means mounted upon said easel-like support, said leaf turning means including a swingable suction member or arm having a face to engage the leaf, with means to hold by suction a portion of the engaged part of the leaf in its own plane, and with means to bend, crinkle or deflect out of that plane another portion of the suction-engaged part of the leaf.

26. Leaf turning mechanism including in combination, a base having motor and suction means, a standard extending upward from the base and having means for conveying power to the operating parts, an easel-like support mounted upon the standard, and leaf-turning means mounted upon said easel-like support, said leaf-turning means including a swingable suction member or arm having a part to engage the topmost leaf by suction; a cycle gear rotated by the motor in one direction only, when the motor is forwardly driven, and thereby accomplishing a single revolution for each cycle of movement of the leaf turning elements, an oscillatory gear member at the axis of swinging movement of said member or arm; and means for transforming each complete revolution of said cycle gear into a to and fro movement of said suction member or arm through said oscillatory gear member.

27. Leaf turning mechanism including in combination, a base having motor and suction means, a standard extending upward from the base and having means for conveying power to the operating parts, an easel-like support mounted upon the standard, and leaf-turning means mounted upon said easel-like support, said leaf-turning means including a swingable suction member or arm having a part to engage the topmost leaf by suction; a cycle gear rotated by the motor in one direction only, when the motor is forwardly driven, and thereby accomplishing a single revolution for each cycle of movement of the leaf turning elements, an oscillatory gear member at the axis of swinging movement of said member or arm; and means for transforming each complete revolution of said cycle gear into a to and fro movement of said suction member or arm through said oscillatory gear member, said cycle gear having means to stop said motor at the end of each cycle of movement of the leaf turning elements.

ARTHUR F. MUSGRAVE.
THEODORE E. DINSMOOR.